Aug. 7, 1945.   E. H. FISCHER   2,381,272
MULTIPLE DIE EQUALIZER
Filed April 20, 1943

WITNESSES:

INVENTOR
Eugene H. Fischer.
BY
ATTORNEY

Patented Aug. 7, 1945

2,381,272

UNITED STATES PATENT OFFICE 2,381,272

MULTIPLE DIE EQUALIZER

Eugene H. Fischer, Derry, Pa., assignor to Westinghouse Electric Corporation, East Pittsburgh, Pa., a corporation of Pennsylvania Application April 20, 1943, Serial No. 483,729

3 Claims. (Cl. 25—102)

The invention relates to presses, and particularly to a press having multiple dies and molds which operate simultaneously to form a plurality of molded articles.

In presses of this type, usually measured amounts of the material to be molded are placed in the mold cavities so that, if possible when the multiple dies descend, equal pressures will be imposed on each mold. However, it is almost impossible to place the same amount of material in each mold and as a result some of the dies will deliver more pressure than others, resulting in a lack of uniformity in the density of the several molded articles in the lot.

It is an object of the invention to provide a press head with multiple dies so constructed that the pressure is equally distributed among the various dies, thereby insuring that all of the dies will deliver a desired minimum pressure.

Figure 1:
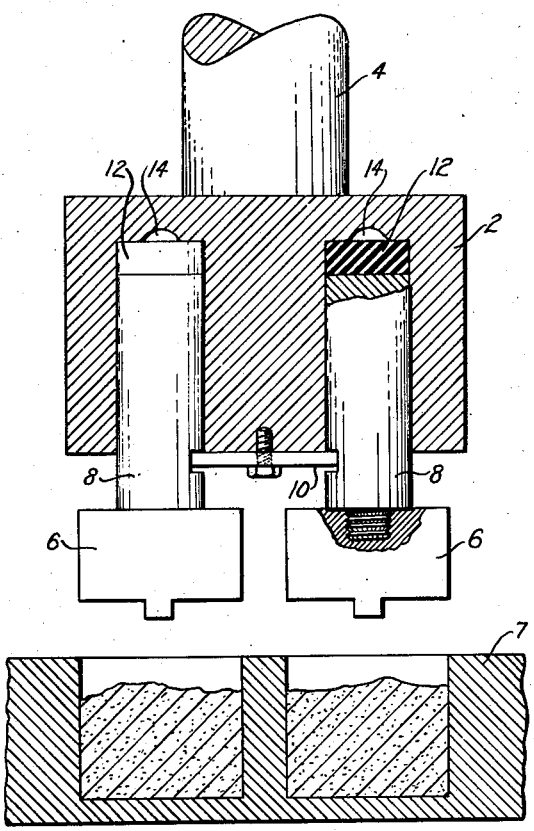
Figure 2:
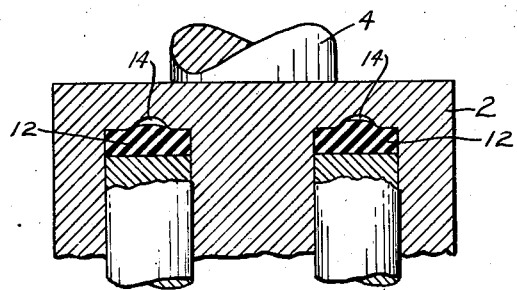

Other objects of the invention will be apparent from the following description and drawing, in which Figure 1 is a view in section with parts broken away of a press head and mold constructed in accordance with the invention, and Fig. 2 is a fragmentary view in section illustrating the operation of the invention.

Referring to Fig. 1, the press comprises a pressure head 2 secured to and actuated by a ram 4 in the usual manner. It is not believed that the mechanism, usually hydraulic, used to actuate the ram 4 needs to be illustrated, as any of the many presses now on the market may be used.

The head 2 carries with it a plurality of dies 6, two being shown in Fig. 1 as an illustration. These dies are removably secured to cylindrical stems or shanks 8, it being understood that other dies may be applied to such stems depending upon the type of molded object desired. The stems 8 extend into holes formed in the head 2 to receive the stems with a sliding fit, and are retained in that position by a plate 10 having edge portions disposed in slots milled in the side wall of the stems 8. This plate 10 also serves the purpose of preventing rotation of the stems 8 and thereby retains the proper register of the dies with respect to the multiple mold 7.

Each stem 8 terminates short of the base of the recess in which it is disposed and in the space thus defined there is a disk 12 of resilient material. The material of the disk 12 may be, for example, rubber or many of the synthetic variations thereof which is substantially non-compressible and resilient. It is possible to obtain synthetic materials, further, of a controlled density so that various predetermined densities may be chosen for various molding applications. These materials will, however, flow under pressure and advantage is taken of this characteristic by providing cavities 14 in the base of the hole so that when a predetermined pressure is applied in operating the die, a predetermined amount of the material of the disk 12 will be forced into such recesses. This is illustrated in Fig. 2 where it will be noted that there is more of the material in the right-hand cavity 14 than there is in the left-hand cavity indicating that there was more material in the mold under the right-hand die than under the left-hand die, but that the pressures on the two have been equalized.

The construction described is of particular advantage when the material to be molded is of such nature that it does not become fluid or fully plastic. For example, it has been found useful in connection with the material described in my Patent No. 2,301,939, issued November 17, 1942, which is a ceramic material and if there is a slight variation in the amount of such material placed in the mold cavities, all of the molded pieces will not be of the same density if usual multiple dies are used.

Quite obviously, variations may be made in the specific construction disclosed, and it is expected that the invention shall be limited only by the scope of the appended claims.

I claim as my invention:

1. In a press comprising a movable pressure head and a plurality of molds each to contain material to be molded, a plurality of dies and means for separately mounting them on said head for reciprocation in the direction of pressure of the head comprising a projecting stem for each die, each stem having a flattened free end and means for securing each to its respective die, recesses in said head proportioned to receive said stems with a sliding fit, a cavity in the base of each recess of smaller size than the cross section of the recess, a substantially incompressible body normally between the end of each pin and the base of its recess and flowable into the cavities a predetermined amount proportional to the pressure exerted by the individual dies.

2. In a press comprising a movable pressure head and a plurality of molds each to contain material to be molded, a plurality of dies and means for separately mounting them on said head for reciprocation in the direction of movement of the head comprising a projecting stem having a flattened free end removably secured to each die, recesses in said head proportioned to receive said stems with a sliding fit, a cavity in the base of each recess of smaller size than the cross section of the recess, a resilient substantially incompressible body normally between the end of each pin and the base of its recess and flowable into the cavities a predetermined amount proportional to the pressure exerted by the individual dies, and means for retaining the stems in their respective cavities.

3. In a press comprising a plurality of molds and a plurality of dies for cooperation therewith, means for mounting said dies comprising a plurality of separate recesses in the press-head for receiving with a sliding fit projecting stems secured to the respective dies, resilient material disposed in each of said recesses between the base thereof and the free end of the respective stem to resiliently oppose movement thereof in the direction of pressure of the press, and a cavity in each recess of smaller size than the cross-section thereof into which said resilient material flows in proportion to the pressure exerted by the respective dies, and means for limiting the movement of said stems.

EUGENE H. FISCHER.